United States Patent [19]

Hostetter

[11] Patent Number: 5,167,146

[45] Date of Patent: Dec. 1, 1992

[54] EMISSIONS TEST ENCLOSURE WITH MINIMIZED AIR EXCHANGE

[75] Inventor: Terrance D. Hostetter, Mt. Clemens, Mich.

[73] Assignee: General Motors Corporation, Detroit, Mich.

[21] Appl. No.: 731,175

[22] Filed: Jul. 15, 1991

[51] Int. Cl.$^5$ .................................... G01M 15/00
[52] U.S. Cl. ..................... 73/117.1; 73/23.31
[58] Field of Search ............ 73/865.6, 23.31, 116, 73/117.1

[56] References Cited

U.S. PATENT DOCUMENTS

| | | | |
|---|---|---|---|
| 3,827,675 | 8/1974 | Schuman | 417/207 X |
| 3,999,425 | 12/1976 | Collin | 73/116 |
| 4,030,350 | 6/1977 | Bier | 73/23.31 X |
| 4,174,627 | 11/1979 | Swis et al. | 73/116 |
| 4,373,377 | 2/1983 | Smith et al. | 73/23.31 |
| 4,653,331 | 3/1987 | Inouye et al. | 73/865.6 X |
| 4,964,298 | 10/1990 | Matsushita | 73/117.1 |
| 5,038,617 | 8/1991 | Rollet et al. | 73/865.6 X |

Primary Examiner—Tom Noland
Attorney, Agent, or Firm—Patrick M. Griffin

[57] ABSTRACT

A vehicle emissions test shed is able to accommodate internal pressure changes due to temperature changes or other causes during a test cycle, which would otherwise cause a measurement threatening air exchange. The pressure is kept constant, without changing the shed volume and without withdrawing air and fuel vapor from within the shed. Airtight compensation bladders within the shed are inflated or exhausted in response to a sensed incipient pressure drop or rise. The pressure is automatically kept substantially constant, preventing leaks in or out of the shed.

2 Claims, 3 Drawing Sheets

EMISSIONS TEST ENCLOSURE WITH MINIMIZED AIR EXCHANGE

This invention relates to vehicle fuel emissions test methods and equipment in general, and specifically to an emissions test enclosure that minimizes outside air exchange.

BACKGROUND OF THE INVENTION

Standards for vehicle fuel systems evaporative emissions are becoming stricter, and the required test procedures are changing, as well. Testing entails keeping the vehicle within an enclosure, generally called a test shed, and measuring the evaporative fuel emissions therefrom over a set time. This is done by measuring the concentration of evaporated fuel in the air within the enclosure. Knowing that, and the volume of air in the shed, the mass of fuel emission can be calculated. Such calculation fails if there is an air exchange or leak across the shed wall during the test. Unless there is a significant pressure differential between the interior of the shed and ambient, however, such exchange is minimal. Still, it is very difficult and expensive to build an absolutely leakproof enclosure.

A new test regimen will require that the temperature inside the shed be sent significantly above and below the ambient during the test cycle, so as to better simulate the conditions that a fuel system would see over an average day. Of course, increasing and decreasing the temperature inside an enclosure will increase and decrease the air pressure. In addition, the length of the test, some 72 hours, means that barometric pressure differentials between the ambient and the enclosure will be experienced. A pressure differential will act across any potential leak paths without some compensation. One proposal is to build a shed with a roof that will rise and fall with the temperature, increasing and decreasing the shed volume so as to prevent the pressure change. While workable, this would be very expensive. Another proposal is to leave the shed volume constant, but to keep the pressure constant by withdrawing air from the main enclosure into a separate enclosure as the temperature rises, and vice versa. This inevitably withdraws some of the fuel vapor emissions from the shed, which have to be separately measured at the end of the test.

SUMMARY OF THE INVENTION

The invention provides a test enclosure of constant volume that keeps the pressure substantially constant without withdrawing air directly from the enclosure. The system can be easily retrofitted to existing enclosures, and operates passively and automatically, with no need to measure fuel vapor concentrations anywhere but within the shed itself.

The enclosure contains a plurality of airtight compensation bladders that can be inflated and deflated from outside the shed. These are prefilled with a predetermined volume of air before the test begins. A sensing membrane incorporated in the enclosure wall flexes in response to a pressure differential induced by a temperature change or other cause. It stays in a neutral, flat condition if the interim pressure stays reasonably constant, but bulges out or in if the pressure rises or falls. Proximity switches respond to the physical movement of the membrane and sense which of the three possible conditions it is in. A source of forced air acts to quickly inflate the bladders if a pressure decrease is sensed and to deflate them if a pressure increase is sensed, and a controller is programmed to turn the source on and off. There is enough initial bladder volume to compensate for the expected pressure increase, and enough extra inflation room to compensate for the expected pressure decrease.

Consequently, the pressure changes only for the short time necessary to move the membrane, and returns quickly back to the norm. Since the pressure differential that would otherwise result from the temperature or barometric changes is largely eliminated, air exchange is minimized. Emissions volume can be calculated simply by measuring interior concentration, as the pressure compensation air is totally isolated. The process is simple, in that the controller acts passively in response just to the sensed membrane position. No active monitoring is needed.

It is, therefore, an object of the invention to provide a method and apparatus to prevent pressure differential induced air exchange across a vehicle emissions test enclosure without actively changing the enclosure volume.

It is another object of the invention to minimize pressure change without having to directly withdraw air and vapor from the enclosure.

It is another object of the invention to provide a system that responds passively and automatically to incipient pressure change without being actively monitored.

It is still another object of the invention to minimize pressure change by providing prefilled compensation bladders inside the enclosure that can be inflated and deflated quickly in response to a sensed incipient pressure change, thereby preventing significant real pressure change and the forced air exchange that would otherwise occur.

DESCRIPTION OF THE PREFERRED EMBODIMENT

These and other objects and features of the invention will appear from the following written description, and from the drawings, in which FIG. 1 is a schematic view of the apparatus of the invention, showing the beginning of a test cycle with the compensation bladders prefilled and the membrane in its neutral position;

FIG. 2 is a view showing the bladders inflated more in response to the membrane bulging in;

Figure 1:
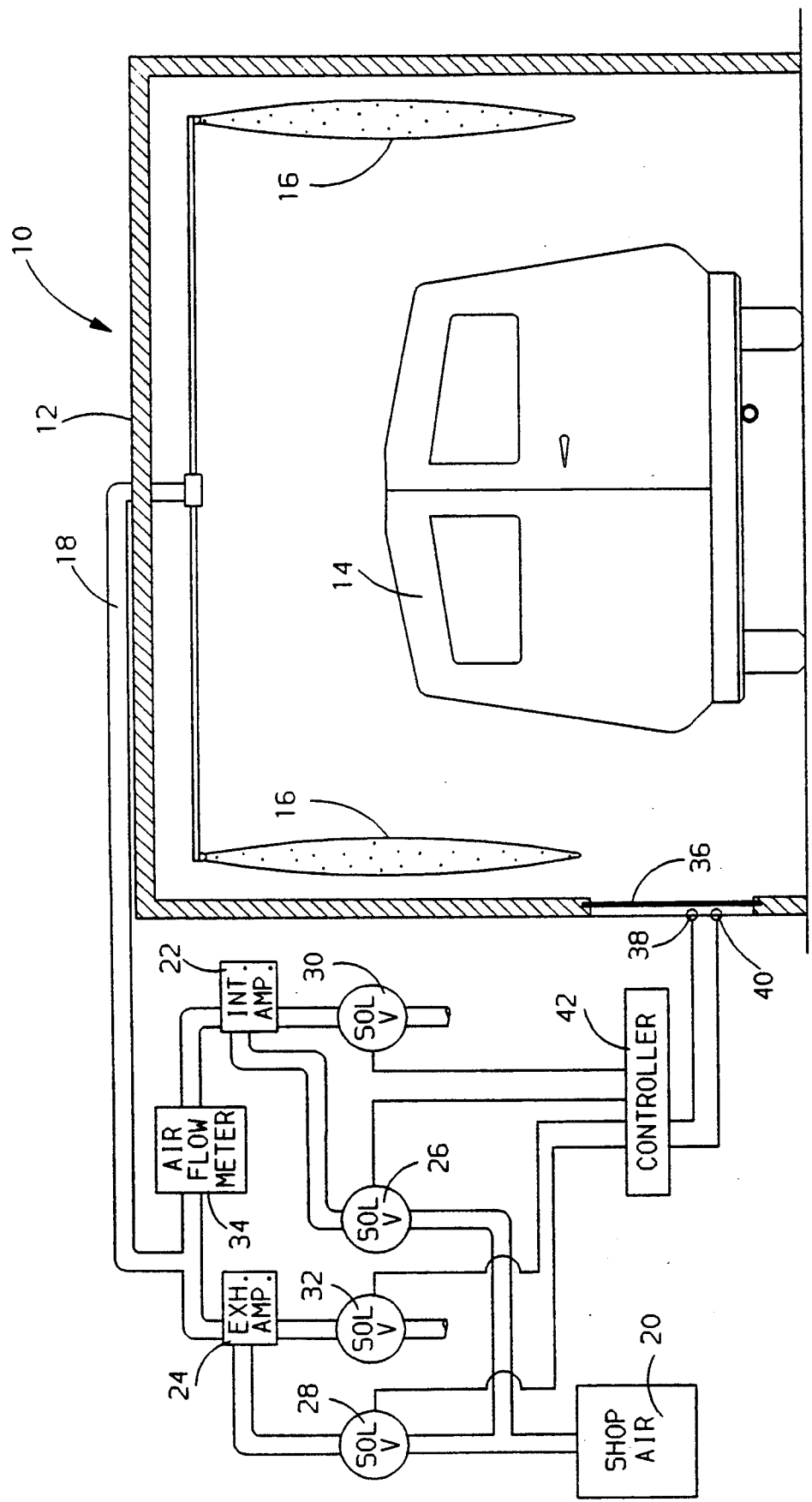

Referring first to FIG. 1, a preferred embodiment of the invention is indicated generally at 10. A walled enclosure or shed 12 of known interior volume contains a vehicle 14. As vehicle 14 sits over time, and especially as the air surrounding it is heated and cooled, the fuel system will emit fuel vapor. Since the interior volume is a given, the mass of fuel emitted over a set test cycle can be calculated if the beginning and ending concentrations of fuel vapor are known, and if the air exchange has been insignificant over the test period. Instruments exist to measure fuel vapor concentrations. However, it is difficult or impossible to make a test shed as large as 12 leakproof. If the temperature is increased or decreased substantially within shed 12, or if a barometric change occurs, the attendant pressure increase or decrease in the interior air will cause an air exchange across any potential leak path. This can seriously jeopardize the accuracy of the emissions calculations.

Still referring to FIG. 1, the additional structure and componentry that is added to shed 12 to compensate is illustrated. A plurality of four airtight compensation bladders, two of which are illustrated at 16, are airtight bags made of a non fuel vapor absorbing plastic material. Each is large enough to hold up to 65 cubic feet of air. The bladders 16 are connected by a hose 18 to an outside source of forced air comprising a supply of pressurized shop air 20 and a pair of so called air amplifiers, an inflating amplifier 22 and an exhausting amplifier 24. The shop air 20 can be selectively supplied to either air amplifier 22 or 24 by opening or closing solenoid valves 26 and 28, respectively. Likewise, the air amplifiers 22 and 24 can be selectively exposed to ambient air by opening or closing solenoid valves 30 and 32, respectively. The air amplifiers 22 and 24 act to increase the airflow available from the shop air source 20 by drawing outside air with a venturi effect. Thus, air can be quickly and forcibly added to, or withdrawn from, compensating bladders 16. An airflow meter 34 is present between the inflating air amplifier 22 to measure the flow that initially inflates bladders 16. The structure that controls flow in or out is described next.

Figure 2:
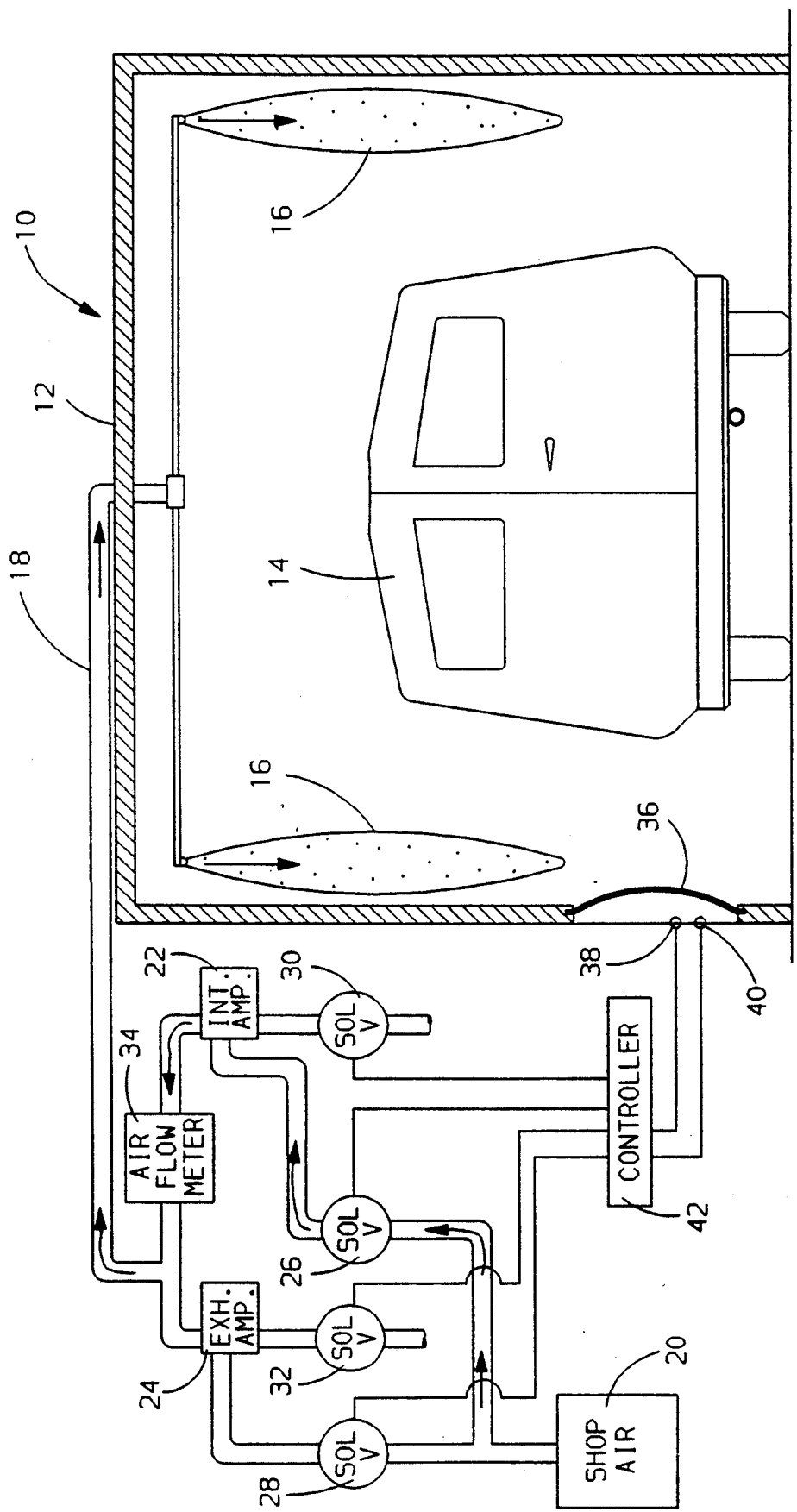

Referring next to FIGS. 1 and 2, an easily flexed rectangular membrane 36 is incorporated in a wall of shed 12. Membrane 36 is a rectangular panel, about three feet by five feet, formed of the same airtight, non-adsorbent material as bladders 16. Membrane 36 will respond quickly to an incipient pressure change in shed 12 by bulging in or out from a neutral, substantially flat condition shown in FIG. 1. For example, in FIG. 2, a pressure decrease has caused membrane 36 to go concave. A pair of proximity switches, an upper switch 38 and lower switch 40, are located next to membrane 36, and arranged so that one is open and one is closed when membrane 36 is in the neutral position. Then, when membrane 36 bulges in or out, only one of the switches changes condition. For example, upper switch 38 can change from open to closed as membrane 36 bulges in, while lower switch 40 can change from closed to open as membrane 36 bulges out. It is arbitrary which switch, 38 or 40, changes with which motion of membrane 36, but the general pattern described allows each of the three possible positions of membrane 36 to be uniquely sensed. A standard computer controller 42 is programmed and wired so as to recognize the three possible membrane 36 positions sensed by the switches 38 and 40, and to respond as described next.

Figure 3:
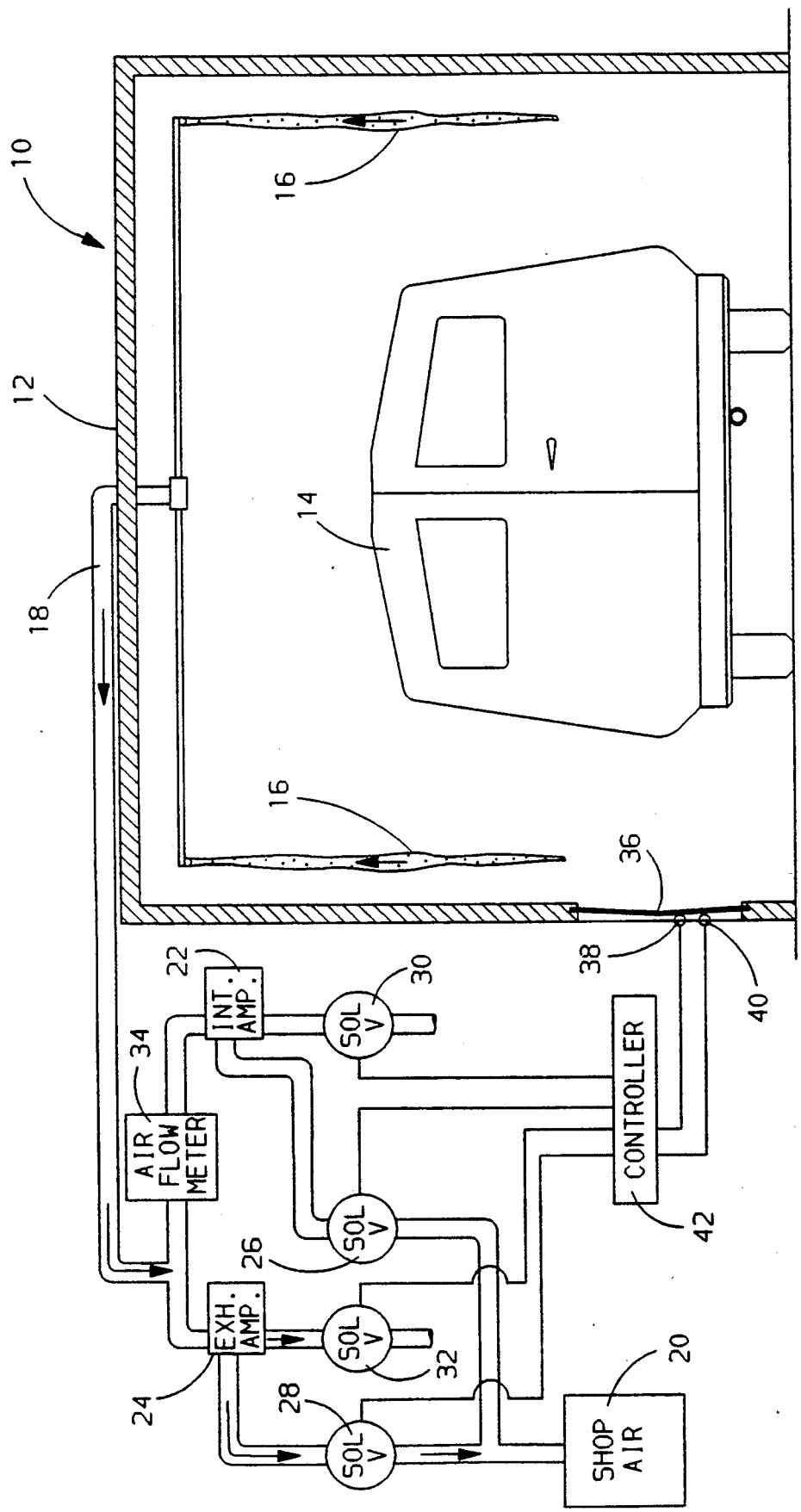
FIG. 3 is a view showing the bladders deflated in response to the membrane bulging out.

Referring next to FIGS. 1 through 3, the general operation of the apparatus 10 is illustrated. In the FIG. 1, neutral position of membrane 36, all valves are closed, and no outside air is being added to or subtracted from the bladders 16. If the pressure in shed 12 begins to drop relative to the ambient air pressure outside shed 12, due, for example, to a test induced temperature drop, membrane 36 bulges inwardly to the concave position shown in FIG. 2. Controller 42 is programmed to open the previously closed valves 26 and 30, but to leave the valves 28 and 32 closed. This exposes shop air 20 to the inflating amplifier 22, and the bladders 16 are inflated. This continues until the volume deficit is made up, and membrane 36 returns to the neutral, substantially flat position. The valves 26 and 30 are then closed again, and no air is added or withdrawn. If the pressure in shed 12 begins to increase, due to a temperature increase, membrane 36 bulges outwardly to the convex position shown in FIG. 3. Controller 42 opens the valves 28 and 32, leaving 26 and 30 closed. Shop air 20 is thereby sent to the exhausting amplifier 24, and the bladders 16 are deflated. This continues until the volume surplus is compensated, and membrane 36 again returns to neutral. The programmer 42 is also programmed to "take a look" at the switches 38 and 40 only at discrete intervals, approximately every 5 seconds, so that the system does not turn on and off too frequently.

During the design process, the expected volume deficit and surplus for any given test cycle would be calculated from the required temperature changes and expected barometric changes, and the internal volume of shed 12. The bladders 16 would be made large enough to accommodate the expected volume change. Before the test cycle, the bladders 16 would be prefilled with enough air to accommodate the expected volume surplus, and would have enough expansion room left to accommodate the expected volume deficit. For the particular size shed 12 shown, and considering the deliberately induced temperature change that would be involved in the test, it was calculated that a volume change of as much as 125 cubic feet would be needed to keep the interior pressure substantially constant. The bladders 16 are more than sufficient in volume to provide that volume differential.

At the start of a test cycle, the meter 34 would be used to measure the necessary prefill. Then, an initial fuel vapor concentration inside shed 12 would be measured, and multiplied by the shed volume, minus the volume of the bladder prefill, to calculate initial emissions mass. When the test is commenced, shed 12 need not be monitored, since the system operates passively and automatically, keeping pressure relatively constant, and avoiding leaks. Therefore, when the shed 12 is returned to its starting temperature, the bladders 16 will automatically return to their prefill volume, or very close to it. Final emissions mass would be calculated on the basis of a new concentration reading times the same net volume figure. Again, the air inside the bladders 16, since it is totally isolated from the interior of shed 12, need not be measured in any way in the final calculation.

Variations in the embodiment disclosed could be made. A passively operating volume surplus and deficit sensor other than the membrane 36 could be used. For example, a balloon type structure within shed 12 would grow with a pressure drop and shrink with a pressure rise. This could trigger proximity switches or similar sensors, as does membrane 36, to signal that inflating or exhausting of bladders 16 was needed to keep the pressure constant. The key to sensing is an automatic, passive, and physically sensible response to the incipient pressure change. More or fewer bladders 16 could be used, depending on their size and the expected temperature changes. Therefore, it will be understood that it is not intended to limit the invention to just the embodiment disclosed.

The embodiments of the invention in which an exclusive property or privilege is claimed are defined as follows:

1. An apparatus for minimizing air exchange across a vehicle fuel system emissions test enclosure during a test in which the pressure inside the enclosure tends to increase and decrease compared to the ambient pressure outside the enclosure, comprising, at least one inflatable and deflatable airtight compensation bladder located inside said enclosure that carries a known volume of air at the beginning of an emissions test, a passively responsive pressure sensor exposed to the interior of said enclosure shed that physically senses increasing, decreasing, or constant pressure, a source of forced air to inflate and exhaust said bladder, and, a controller programmed to respond to said pressure sensor to inflate said bladder when a pressure decrease is sensed, to deflate said bladder when a pressure increase is sensed, and to do neither when a constant pressure is sensed, whereby the pressure inside said enclosure is kept substantially constant, thereby minimizing air exchange.

2. An apparatus for minimizing air exchange across a vehicle fuel system emissions test enclosure during a test in which the pressure inside the enclosure tends to increase and decrease compared to the ambient pressure outside the enclosure, comprising, at least one inflatable and deflatable airtight compensation bladder located inside said enclosure that carries a known volume of air at the beginning of an emissions test, a membrane provided in a wall of said enclosure that moves from a substantially flat, neutral position to a concave position in response to pressure drop and a convex position in response to pressure rise, a source of forced air to inflate and exhaust said bladder, and, a controller programmed to inflate said bladder when said membrane is in its concave position, to deflate said bladder when said membrane is in its convex position, and to do neither when said membrane returns to its neutral position, whereby the pressure inside said enclosure is kept substantially constant, thereby minimizing air exchange.

* * * * *